(12) United States Patent
Turner et al.

(10) Patent No.: US 6,581,315 B2
(45) Date of Patent: Jun. 24, 2003

(54) FORMED LENS TAB FOR DESIGNATION CARD INSERT

(75) Inventors: Julia Carol Turner, Woodlawn (CA); Michael Stephen McGuire, Ottawa (CA); Hans Dieter Beisner, Oxford Mills (CA)

(73) Assignee: Mitel Knowledge Corporation (CA)

( * ) Notice: Subject to any disclaimer, the term of this patent is extended or adjusted under 35 U.S.C. 154(b) by 0 days.

(21) Appl. No.: 09/916,165

(22) Filed: Jul. 26, 2001

(65) Prior Publication Data
US 2002/0020093 A1 Feb. 21, 2002

(30) Foreign Application Priority Data
Jul. 27, 2000 (GB) ............................................... 0018475

(51) Int. Cl.[7] ............................... G09F 3/18; G09F 3/20
(52) U.S. Cl. ............................ 40/642.02; 40/5; 40/336; 40/667
(58) Field of Search ......................... 40/5, 299.01, 336, 40/337, 338, 339, 633, 642.02, 634, 661, 667, 611

(56) References Cited

U.S. PATENT DOCUMENTS

| 4,120,107 | A | * | 10/1978 | Bukowsky | 40/336 |
| 4,291,475 | A | * | 9/1981 | Schoemer | 40/338 |
| D262,214 | S | * | 12/1981 | Obst | 40/336 X |
| 4,322,001 | A | * | 3/1982 | Hurley | 206/449 |
| 5,522,163 | A | * | 6/1996 | Neugebauer | 40/780 |
| 5,774,542 | A | * | 6/1998 | Casey et al. | 40/661 X |
| 6,366,456 | B1 | * | 4/2002 | Wu et al. | 40/5 X |

FOREIGN PATENT DOCUMENTS

| EP | 0545132 | 6/1993 |
| GB | 0722525 | 1/1955 |
| GB | 0848100 | 9/1960 |

* cited by examiner

Primary Examiner—Brian K. Green
(74) Attorney, Agent, or Firm—Jones Day

(57) ABSTRACT

A flat, substantially transparent lens lying in a flat plane retains a designation card within a recess in a surface. The lens is made of flexible sheet plastic with means at either end for securing the lens in the recess. At one end, a tab is integral with the lens and has an attachment end which joins the lens. The tab extends away from the plane of the lens to a geniculation spaced from the lens plane. At the geniculation, the tab reverses direction and extends toward the lens plane to return generally to that plane, where it terminates in a finger grip.

2 Claims, 4 Drawing Sheets

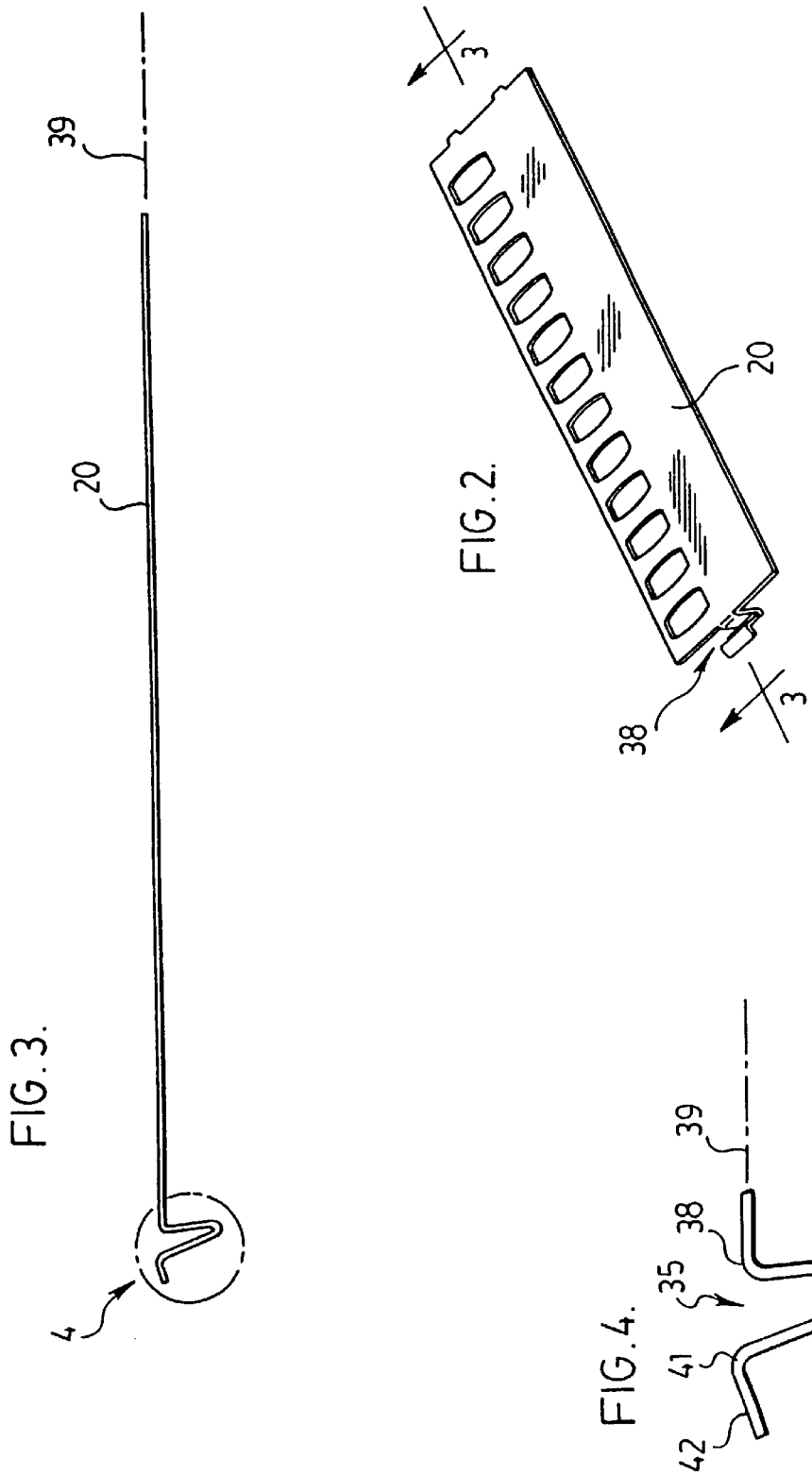

FORMED LENS TAB FOR DESIGNATION CARD INSERT

This invention relates generally to the problem of attaining secure retention for lenses which are used to hold in place a designation card of paper or plastic containing written, typed or printed information that may require periodic updating. One area of use involves telephone housings, of which some models include a shallow recess in one surface intended to receive the information-bearing card. In the field of this invention, the word "lens" (pl. lenses) designates a flat, translucent, resilient cover or cap, and does not include a component with magnifying properties.

BACKGROUND OF THIS INVENTION

Prior to the present development, injection molded lenses and non-injection-molded lenses have been used. Lenses of both kinds require expensive tooling and high part costs. Also, due to the inherent properties of the injection molding process, many parts contain flaws and are subsequently rejected, so as not to compromise the overall impression of quality in the products. The non-injection-molded lenses previously employed are very difficult to remove and typically require the use of an appropriate tool.

GENERAL DESCRIPTION OF THIS INVENTION

In order to hold the lens and the underlying information card securely during regular use, transportation or adverse environmental conditions, a device is provided which requires only a low-actuating force, and is easily understood in terms of the method for removal and assembly of the components. This ease of use promotes regular updating of the card, allowing accurate information to be presented to the user.

More particularly, this invention provides a flat, substantially transparent lens lying generally in a substantially flat plane, the lens being adapted to retain a designation card within a recess in a surface, the lens being made from resiliently flexible sheet plastic and having first and second opposed ends, first means at said first end by which the first end can be removably retained in the recess, and second means at said second end by which the second end can be removably retained in the recess; said first means comprising a tab integral with the plastic of the lens, the tab extending from an attachment end where it joins the lens, thence extending generally athwart the plane of the lens to a geniculation spaced away from said plane, at which geniculation the tab generally reverses direction and extends generally athwart the plane of the lens to return generally to said plane, where it terminates in a finger-grip by which the lens can be released from, or snapped into, the recess.

Further, this invention provides in combination: a surface having a recess adapted to receive a designation card, and a lens extending in a substantially flat plane, the lens being adapted to retain a designation card within said recess, the lens being of resiliently flexible sheet plastic and having first and second opposed ends, first retention means at said first end by which the first end can be removably retained in the recess, and second retention means at said second end by which the second end can be removably retained in the recess; said first means comprising a tab integral with the plastic of the lens, the tab extending from an attachment end where it joins the lens, thence generally athwart the plane of the lens to a geniculation spaced away from said plane, at which geniculation the tab generally reverses direction and extends generally athwart the plane of the lens to return generally to said plane, where it terminates in a finger-grip by which the lens can be released from, or snapped into, the recess.

GENERAL DESCRIPTION OF THE DRAWINGS

One embodiment of this invention is illustrated in the accompanying drawings, in which like numerals denote like parts throughout the several views, and in which:

FIG. 2 is a similar oblique perspective view of the lens by itself,

FIG. 3 is a longitudinal sectional view taken at the line 3—3 in FIG. 2;

FIG. 4 is an enlarged detail of the portion included in the circle 4 shown in FIG. 3;

DETAILED DESCRIPTION OF THE DRAWINGS

Figure 1:
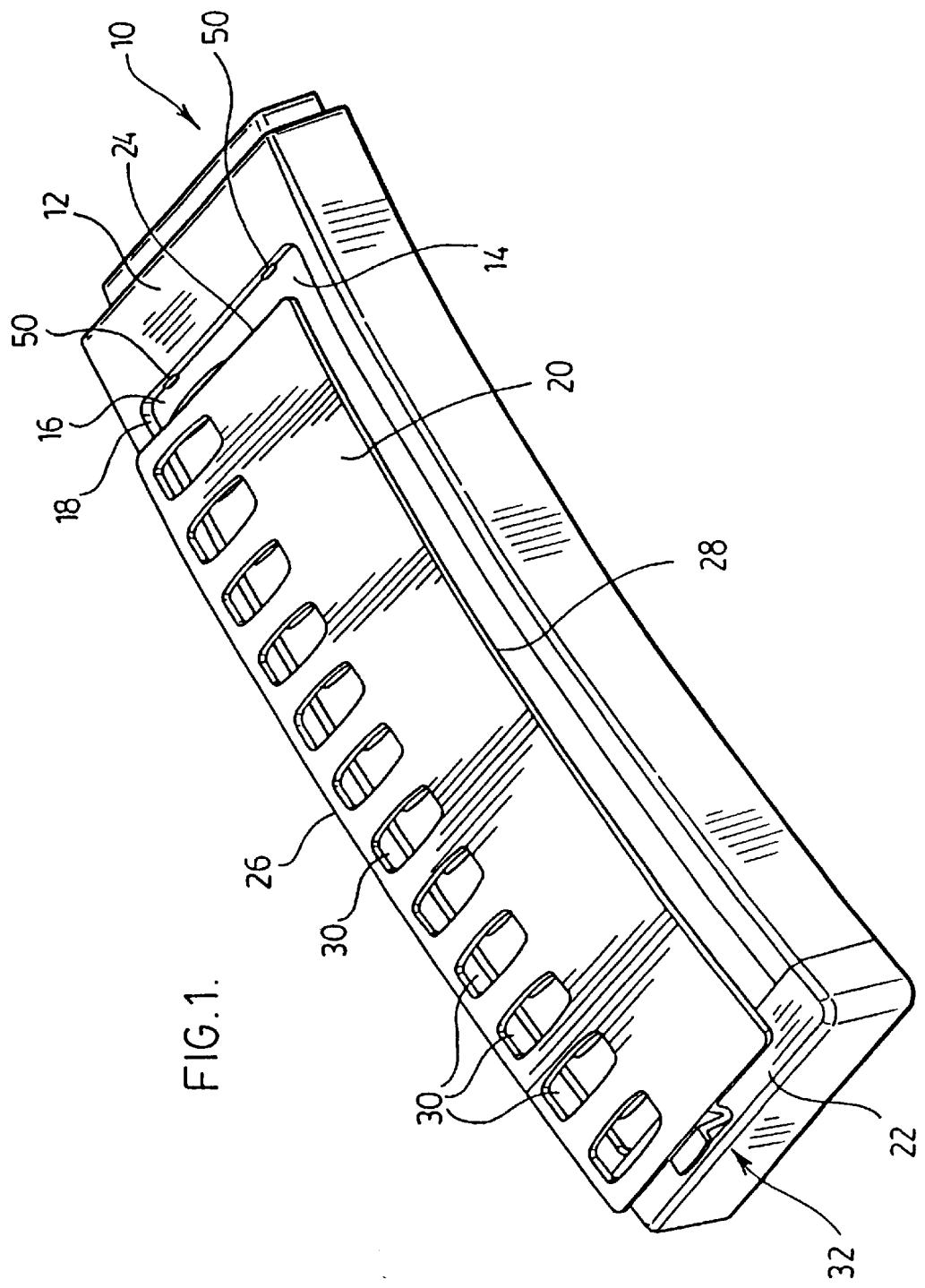
FIG. 1 is an oblique perspective view of a lens embodying the present invention, the lens being located adjacent a recess in which it fits.

Attention is first directed to FIG. 1 showing a housing member 10 having an outer surface 12 which defines a recess 14, the recess 14 having a bottom surface 16 and an edge wall 18. (The housing member 10 is often called a "cover".)

A lens 20 is provided, which in the embodiment illustrated is substantially rectangular with a pair of shorter opposed parallel edges 22 and 24 and a pair of longer opposed parallel edges 26 and 28. In this embodiment, the lens 20 has a series of elongate openings 30 distributed along and adjacent the edge 26. The openings 30 are adapted snugly to receive a plurality of upwardly projecting items, which could be LED's, control buttons, or the like. The presence, absence or configuration of the openings 30 is unrelated to the present invention.

Hereinafter, the edge 22 identifies the first end of the lens 20, and the edge 24 identifies the second end of the lens 20.

The lens 20 includes first means at the first end 22 by which the first end 22 can be removably retained in the recess 14. This first means is generally shown at the numeral 32, and it is such as to allow the first end 22 of the lens 20 to be removably retained in the recess 14. Also included is a second means 34 (see FIG. 5) at the second end 24 by which the second end can be removably retained in the recess 14. More specifically, the first means 32 is fashioned from a tab 35 which is integral and coplanar with the lens 20 in the as-stamped condition. In an operation subsequent to stamping, the tab 35 is permanently deformed to the configuration as seen in elevation in FIG. 4. Typically, the application of heat and pressure, or bending, will suffice to make the conversion so that the tab 35 has an attachment end 38 where the tab 35 joins the lens 20, the tab thence extending generally athwart (generally perpendicular to) the plane 39 (see FIG. 4) to a geniculation 40 spaced away from the plane 39, at which geniculation the tab 35 generally reverses direction and extends generally athwart (perpendicular to) the plane 39 of the cover to return generally to said plane, where it terminates in a finger-grip 42 by which the lens 20 can be released from, or snapped into, the recess 14. Because the geniculation 40 (FIG. 4) is further below the plane 39 than the depth of the edge wall 18 of the recess 14, the housing member includes a recess portion 43 of greater depth adjacent the middle of the corresponding end of the main recess 14.

Figure 5:
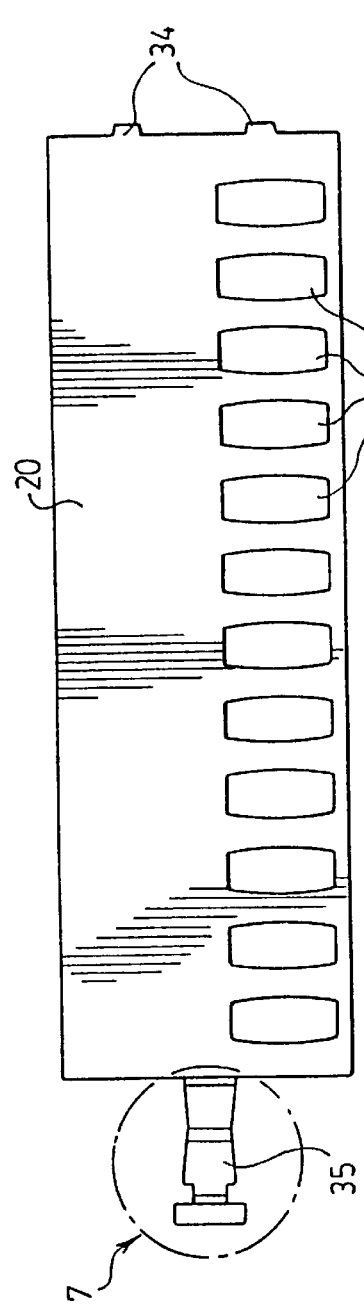
FIG. 5 is a bottom plan view of the lens in as-stamped condition.
Figure 6:
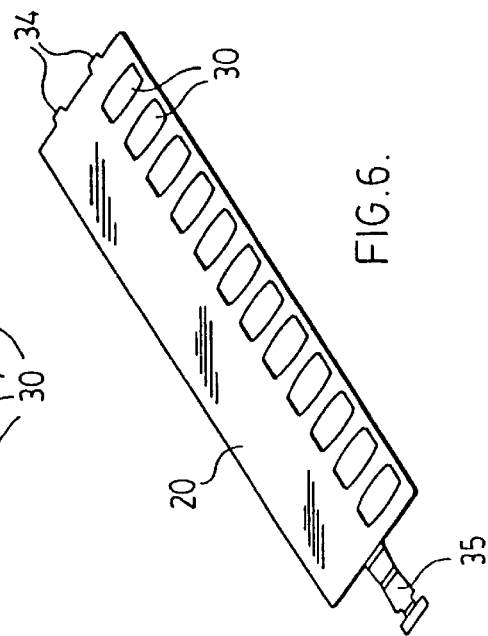
FIG. 6 is an oblique perspective view corresponding to FIG. 5.

At the rightward end of the lens 20, and as best pictured in FIG. 5, the means for removably retaining the rightward end of the lens 20 in the recess 14 includes projections 34 (two in number in the particular embodiment illustrated) which are adapted to register within appropriate openings 50.

Figure 7:
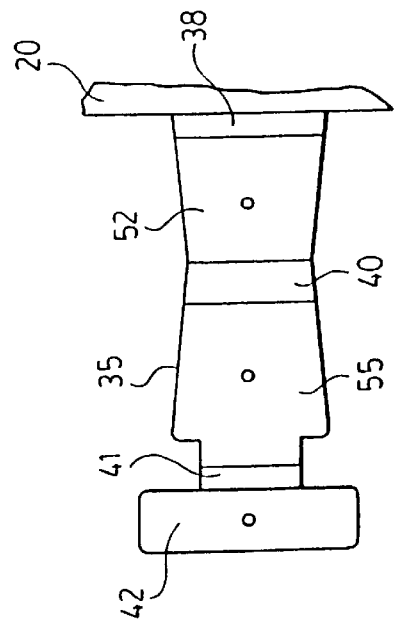
FIG. 7 is a plan view of the tab in the detail marked 7 in FIG. 5, but to a considerably larger scale.

Attention is now directed to FIG. 7, for an explanation of a particular configuration of the tab 35 in the embodiment which is illustrated in FIG. 7.

Figure 8:
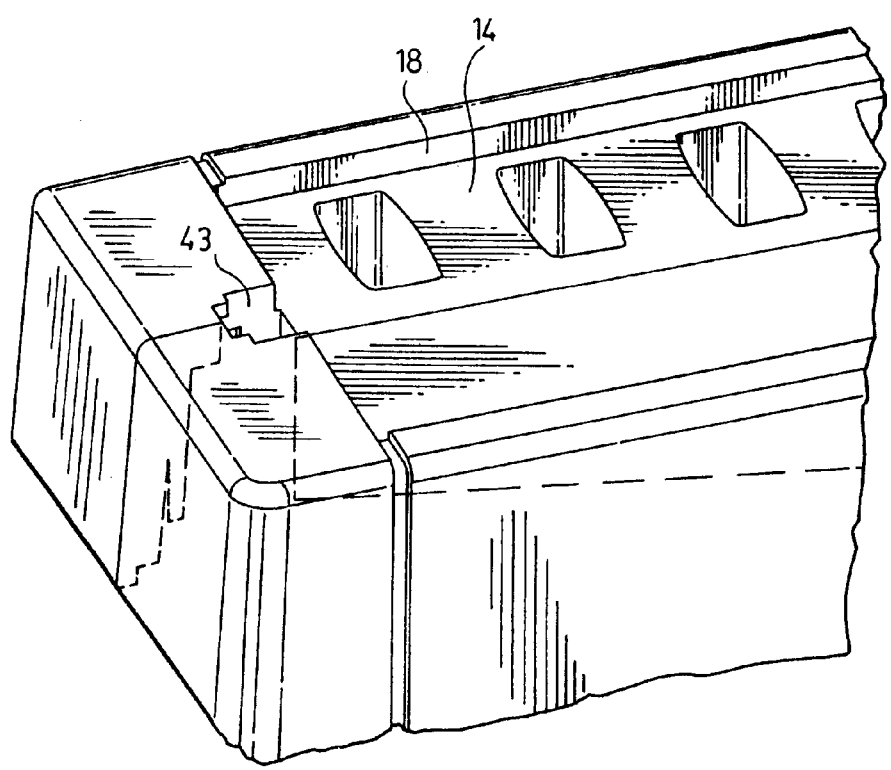
FIG. 8 is a partial perspective view of a component defining the recess of FIG. 1.

It has been explained above that the tab 35 has an attachment end 38 where it joins the lens 20, and that the tab extends generally athwart (perpendicular to) the plane 39 of the lens 20 to a geniculation 40 spaced away from the plane 39. The part of the tab 35 undergoing this extension is illustrated at 52 in FIG. 7, where it can be seen that the part 52 has a converging taper in the direction away from the attachment end 38. The tab 35 also has a portion 55 with a diverging taper in the direction away from the attachment end. The result of the tapers is that the width of the tab is at a minimum at the location of the geniculation 40, thus facilitating the insertion of the tab 35 into the appropriate opening or recess 43 (see FIG. 8).

Furthermore, it will be seen in FIG. 7 that the lateral dimension of the finger grip 42 (measured vertically on the drawing sheet) exceeds the lateral dimensions of the parts 52 and 55, thus minimizing the risk that the finger grip 42 will be become stuck within the cover 10.

It is thus seen that there has been provided a device co-operating with the recess, the device functioning to maintain an information card or the like within the recess during regular use, transport or adverse environmental conditions. The device or lens also provides a low-actuation force which is easily overcome in order to remove or exchange the components. This ease of use promotes regular updating of the card, allowing accurate information to be presented to the user. This may have the advantage of promoting custom feature use and accurate key actuation in various products where this invention is included.

In light of the foregoing description, it will be recognized that a unique aspect of the present invention is that the plastic sheet is shaped in such a way as to utilize the inherent spring action of the form and the inherent flexibility of the plastic sheet, allowing the lens to be easily removed or inserted. In addition to this, the lens is shaped in such a way that it is retained in the fitted recess securely by overlapping geometry.

As a specific but non-limiting example, this invention has been carried out utilizing 0.02" thick frosted but translucent Lexan™. As described above, the lens 20 has an integral tab 35 centrally of one end, the shape of the tab, after it has been deformed, matching that of a recess 43, thus providing side-to-side orientation and retention by its inherent geometry.

It should be pointed out that the geniculation 40 acts as the main spring for the lens 20. It allows the thinner section of the lens to come to rest in an undercut on a mating surface in the housing member 10. The finger grip 42 is important, as it allows the user to apply counter-force to the spring action of the geniculation 40, in order to disengage the lens 20 and remove it from the recess 14.

The tapers in the portions 52 and 55 assist the spring action of the lens. The tapers make tab 35 easier to activate, as it has less material to deform, and help to guide the tab 35 into the mating slot (recess 43) for secure retention.

It will be appreciated that different materials and different thicknesses may be used for different applications. The size of the finger grip 42 can be adjusted to promote security and tamper prevention. A variety of manufacturing technologies can be used to form the tab, these including stamping, thermoforming, vacuum forming, and extrusion.

It is believed that the invention disclosed herein could retrofit into existing telephone sets. It could be utilized wherever an easily accessible designation card is required. This can include, but is not limited to: computer cabinets and faceplates, rack-mounted equipment cabinets and faceplates, printers and plotters, handsets, cordless handsets, cell phones, Personal Data Organizers (PDA's), and picture frames.

While one embodiment of this invention has been illustrated in the accompanying drawings and described hereinabove, it will be evident to those skilled in the art that changes and modifications may be made therein without departing from the essence of this invention, as set forth in the appended claims.

The embodiment of the invention in which an exclusive property of privilege is claimed are defined as follows:

1. In combination: a surface having a recess adapted to receive a designation card, and a flat, substantially transparent lens extending in a substantially flat plane, the lens being substantially rectangular with two pairs of opposed parallel edges and being adapted to retain a designation card within said recess, the lens being of resiliently flexible sheet plastic and having first and second opposed ends, first retention means at said first end by which the first end can be removably retained in the recess, and second retention means at said second end by which the second end can be removably retained in the recess; said first means comprising a tab integral with the lens, the tab being located substantially midway on one of the edges and extending from an attachment end where it joins the lens, thence extending generally athwart the plane of the lens to a geniculation spaced away from said plane, at the geniculation the tab generally reverses direction and extends generally athwart the plane of the lens to return generally to said plane, where it terminates in a finger-grip by which the lens can be released from, or snapped into, the recess, said surface defining an opening at a location within the recess corresponding to a tab position, said opening being sized and configured to receive said tab when the lens is within said recess, and a portion of the tab which lies between the attachment end and said geniculation having a converging taper in a direction away from the attachment end, and a portion of the tab which lies between the geniculation and said finger-grip having a diverging taper in a direction away from the attachment end, whereby the width of the tab is at a minimum at a location of the geniculation, thus facilitating the insertion of the tab into the opening.

2. The combination claimed in claim 1, in which the finger-grip has a lateral dimension, measured parallel to the edge to which the tab is attached, which exceeds a lateral dimension of the opening, thereby minimising the risk of the tab becoming stuck within the opening.

* * * * *